United States Patent

[11] 3,632,060

| [72] | Inventor | Arnold Balder<br>Hamburg-Garstedt, Germany |
|---|---|---|
| [21] | Appl. No. | 881,519 |
| [22] | Filed | Dec. 2, 1969 |
| [45] | Patented | Jan. 4, 1972 |
| [73] | Assignee | Klippan G.m.b.H.<br>Hamburg-Garstedt, Germany |
| [32] | Priority | Dec. 5, 1968 |
| [33] | | Germany |
| [31] | | P 18 12 864.8 |

[54] TENSION LIMITER FOR SAFETY BELTS IN MOTOR VEHICLES
12 Claims, 4 Drawing Figs.

[52] U.S. Cl. .................................................... 242/107.4,
280/150 SB, 297/386
[51] Int. Cl. ...................................................... A62b 35/00,
B65h 75/48
[50] Field of Search ............................................ 242/107,
107 SB, 107.4; 188/1; 297/386, 388, 389; 280/150 SB

[56] References Cited
UNITED STATES PATENTS

| 3,089,564 | 5/1963 | Smittle .......................... | 297/386 X |
| 3,178,225 | 4/1965 | Bayer ............................ | 297/386 |
| 3,442,466 | 5/1969 | Fritsche ......................... | 242/107.4 |

*Primary Examiner*—Stanley N. Gilreath
*Assistant Examiner*—Werner H. Schroeder
*Attorney*—Lowry, Rinehart, Markva & Smith ABSTRACT: A tension limiter for safety belts in motor vehicles comprises a substantially disc-shaped plastically deformable reaction member arranged continuously to be deformed by deforming means when a safety belt is withdrawn from its winding shaft, said deformable reaction member during rotation of the winding shaft being continuously deformed in one direction at at least a first spot and in the opposite direction at at least a second spot.

Inventor:
ARNOLD BÄLDER
BY
Lowry, Rinehart & Markva
ATTORNEYS

Inventor:
ARNOLD BÄLDER
BY
Lowry, Rinehart & Markva
ATTORNEYS

TENSION LIMITER FOR SAFETY BELTS IN MOTOR VEHICLES

BACKGROUND OF THE INVENTION

This invention relates to a tension limiter for safety belts in motor vehicles which comprises a substantially disc-shaped plastically deformable reaction member which is continuously deformed by at least one deforming member when a safety belt is withdrawn from its winding shaft by a powerful pull of said belt. In order to destroy the kinetic energy of a person wearing the safety belt when an accident occurs and the wearer is thrown forward in the vehicle and in order to limit the tension of the safety belt in such circumstances to a value the wearer can still be expected physically to withstand a tension limiter may be provided for instance where the belt is anchored to the floor or to a pillar of the vehicle body. The tension limiter may comprise a deformable reaction member which is continuously deformed when the belt is withdrawn from a winding shaft by a powerful pull.

In a known type of tension limiter the deformable member is a steel tape which is drawn around a deforming member and thereby deformed when it is pulled into the vehicle interior by a powerful pull of the belt.

Unfortunately tension limiters of this kind are hazardous to a passenger in the back of the vehicle, since the extended steel may cause injuries. With a view to eliminating this hazard a tension limiter has already been proposed in which the restraining steel tape is wound up on a shaft from which a powerful pull of the belt can unwind the tape and rewind it on another shaft. However, even this type of limiter has the defect that the pull of the belt can only be limited for the time it takes to unwind a tape of given length. Assuming that the wound steel tape is 20 cm. long and further assuming that the belt embracing the chest of the wearer slips when in an accident the wearer is thrown forward, the total forward movement within which the pull of the belt is limited and kinetic energy is destroyed and within which the full length of the tape is unwound and rewound may be only 10 cm. In practice it is desirable that the pull of the belt should continue to be limited during a total forward movement of about 30 cm. Although this can be achieved by making the metal tape about 60 cm. long, this would require the provision of large boxlike fittings for accommodating the tape and such fittings would take up undue space restricting the freedom of movement of the occupants of the vehicle.

SUMMARY OF THE INVENTION

It is the object of the present invention to provide a tension limiter for safety belts in motor vehicles which is extremely compact and which yet permits the pull of the belt to be limited to a constant maximum value even when the wearer is thrown forward a major distance of say about 30 cm.

To attain this object the present invention provides a tension limiter for safety belts in motor vehicles which comprises a substantially disc-shaped plastically deformable reaction member and means for deforming said reaction member continuously in one direction at at least one spot and in the opposite direction at at least another spot when a safety belt is withdrawn from its rotatable winding shaft.

In such an arrangement the winding shaft can rotate any number of times, and any length of belt can thus be withdrawn from its housing without requiring a deformable member of correspondingly large size. The continuous deformation of the reaction member in one direction followed by deformation in the opposite direction permits the deformable reaction member to be of relatively small size and at the same time the braking effect is independent of the size of the deformable reaction member because the process of deformation is cyclically repeated.

In a useful embodiment of the invention this continuous deformation can be produced by providing deforming means which comprise two deforming members each provided with at least one projection, the projections pressing against the reaction member from opposite sides. If these projections are constituted by diametrical bends and the reaction member has a conformable bend, then the deformation will consist in this latter bend in the reaction member being forced to travel continuously around the reaction member rotating between stationary deforming means which may be constituted by the sidewalls of a U-shaped holder, a housing or the like. The effort expended in producing this continuous deformation should be equal to the energy of forward motion of the wearer which it is intended to destroy.

Preferably the effort required for deformation may be adjustable to a prescribed tensile pull of the belt. Adjustability can be provided by making the distance between the deforming member adjustably variable. For instance, if this distance is increased by the adjustment of screws the reaction member will be subjected to less deformation between the two deforming members and the braking force on the belt will be correspondingly less than when the said distance is shorter.

Instead of providing a reaction member that is rotatable in relation to a stationary deforming member the converse arrangement may be employed in which the deformable reaction member is stationary and the deforming members fast on the rotatable winding shaft bear against the sides of the reaction member.

For conveniently deforming the reaction member first towards one side and thereafter or simultaneously to the other side during each revolution of the winding shaft to generate a continuous cyclically repeating breaking effect, it is preferred to provide each of the deforming members with at least one projection of which one presses a corrugation into the reaction member from one side and the other presses a corrugation into the reaction member from the opposite side during each revolution of the shaft. Each deforming member may be provided with a circular groove for the reception of the corrugation in the reaction member. If the two projections on two deforming members are at the same radial distance from the axis of the rotatable winding shaft and this also applies to the adjoining circular grooves, the projection on one deforming member can be arranged to press a corrugation into the reaction member from one side in such a manner that this corrugation is received into the groove in the other deforming member, whereas the projection of this latter deforming member may press this corrugation back again into the circular groove in the first-mentioned deforming member.

In the course of each revolution of the reaction member or of the deforming members in relation to the reaction member, part of the reaction member will thus be pressed into the groove of one of the deforming members which then immediately presses the deformed part back again into the groove in the other deforming member. The magnitude of the torque required for producing this deformation may be adjusted for instance by providing projections in the form of adjustable screws or rotatably mounted balls which may likewise be adjustably locatable by means of screws.

BRIEF DESCRIPTION OF THE DRAWINGS

Several embodiments of the invention will now be described by way of example and with reference to the accompanying drawings, in which.

DESCRIPTION OF THE PREFERRED EMBODIMENTS

Figure 1:
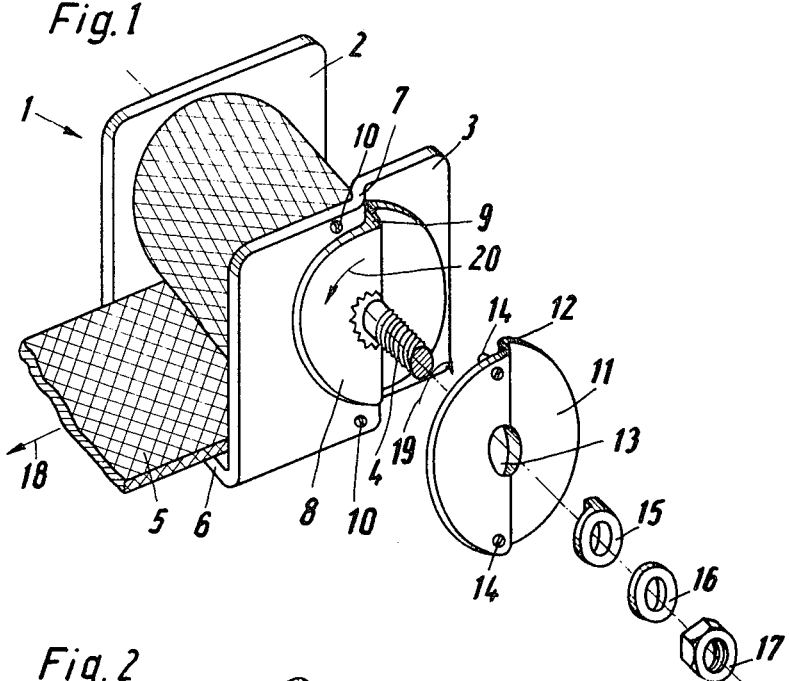
FIG. 1 is an exploded perspective view of a tension limiter for a safety belt in motor vehicles according to the invention, in which a plastically deformable reaction member is provided in the form of a rotatable disc.

In FIG. 1 a tension limiter for safety belts in motor vehicles is shown which comprises a substantially U-shaped holder 1 consisting of two spaced parallel sidewalls 2 and 3 connected by a base 6. A winding shaft 4 is rotatably mounted between the sidewalls 2 and 3 of the holder 1. The end portion of a safety belt 5 is wound on the shaft 4.

The sidewall 3 that constitutes a first deforming member of deforming means is formed with a bend 7 extending perpendicularly to the base 6. A plastically deformable reaction member in the form of a disc 8 made of sheet steel is formed with a diametrical bend 9 in such a manner that the disc 8 tightly fits against the outside of the sidewall 3. This disc 8 is firmly keyed to the shaft 4 by interengaging gear teeth. Below its upper edge as well as above its bottom edge the sidewall 3 is provided with a tapped hole 10. A steel plate 11 which constitutes a second deforming member of the deforming means is provided with a diametrical bend 12 corresponding to the bends 7 and 9, and has a central hole 13 for the reception of the shaft 4. Adjacent the upper end as well as adjacent the bottom end of its bend 12 the plate 11 is fitted with an adjustable screw 14. The two screws 14 permit the distance of the plate 11 from the sidewall 3 to be adjusted as may be desired. When the plate 11 has been mounted on the shaft 4 a washer 15 is pushed onto the shaft. The inner face of said washer is shaped to engage the bend 12 in the plate 11, whereas the outer face of the washer is flat. The washer 15 is held in position by a ring 16 and a nut 17.

If the safety belt suddenly applies a major pull to the tension limiter in the direction of the arrow 18, the end portion of the safety belt 5 will unwind from the shaft 4 in the direction indicated by an arrow 19. The rotation of the shaft 4 forces the disc 8 to turn between the surfaces of the sidewall 3 and the steel plate 11. It can do this only by being continuously deformed between the two bends 7 and 12. This deformation consists in the bend 9 of the disc 8 being continuously displaced like a wave rotating counterclockwise in the direction of the arrow 20. The effort needed for effecting this deformation destroys a like amount of kinetic energy of the person wearing the belt. This effort can be selectably varied by adjustment of the screws 14 which determine the clearance between the sidewall 3 and the steel plate 11. By increasing this clearance the degree of deformation of the disc 8 can be reduced, whereas its deformation will be the greater the smaller the clearance.

Figure 2:
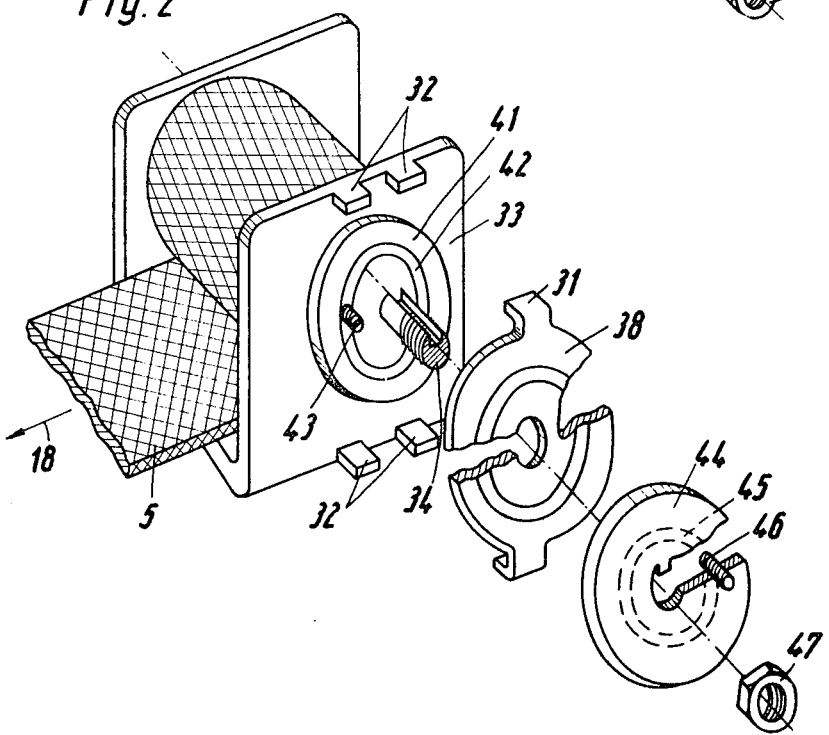
FIG. 2 is a similar view of a tension limiter in which the plastically deformable reaction member is a stationary disc.

The principal difference of the embodiment shown in FIG. 2 from that shown and described by reference to FIG. 1 is that the plastically deformable reaction member is a disc 38 which does not participate in the rotation of the shaft which in this embodiment is designated by the reference numeral 34. The disc 38 is loose on the shaft 34 and is formed at diametrically opposite positions with lugs 31 each engaging a pair of teeth 32 at the top respectively the bottom of the neighboring sidewall 33 of the U-shaped holder, thereby to prevent the disc 38 from rotating.

Interposed between the sidewall 33 and the deformable disc 38 the shaft 34 carries a first deforming member 41 which is keyed to the shaft and therefore rotates with the shaft. The outside face of this deforming member 41 is provided with a circular groove 42 from which a first pin 43 projects. Facing the outside of the disc 38 the shaft 34 carries a second deforming member 44 which on the side facing the disc 38 has a circular groove 45 from which a second pin 46 projects. The diameter of the circular groove 45 equals that of the groove 42. The pin 46 and the pin 43 are located at opposite ends of a diameter through the axis of the shaft 34. Consequently, if the first deforming member 41, the disc 38 and the second deforming member 44 are clamped together on the shaft 34 by a nut 47, the pin 43 will form an indentation in the disc 38 which on the opposite side of this disc will form a projection engaging the groove 45 in the second deforming member 44, whereas the pin 46 of the second deforming member 44 will produce a like indentation in the disc 38 which will form on the opposite side of this disc a projection entering the groove 42 in the first deforming member 41. When the safety belt 5 is withdrawn from the shaft 34, it will cause the shaft 34 and the two deforming members 41 and 44 which are fast on the shaft to rotate. Consequently, the pin 43 will continuously create a corrugation projecting from one side of the disc 38, whereas the other pin 46 will push this corrugation back again and continuously create a corrugation on the other side of the disc 38.

It will be readily understood that in this embodiment there is likewise a continuous destruction of energy, however, many times the shaft 34 is rotated, i.e., irrespectively of the length of belt 5 that is unwound. In this embodiment it is in principle naturally also possible to limit the tensile pull of the belt in the direction of the arrow 18 to a higher or lower value. This can be done for instance by using screws instead of the pins 43 and 46 since their effective length can then be adjustably varied.

The invention may also be applied with advantage to so-called belt takeup reels, i.e. devices adapted to take up slack in the belt by spring mechanisms. Such devices must be provided with locking means which prevent withdrawal of the belt, for instance when an accident occurs. Such locking means may take the form of centrifugal clutches which automatically couple the rotating shaft to the stationary casing of the device or to some other fixed part when the acceleration of the shaft exceeds a given value, and which thus prevent further withdrawal of the belt.

A suitable embodiment of the invention for association with a belt takeup reel comprises coupling means for coupling a deformable disc to the shaft of the takeup reel when a given acceleration is exceeded, in such a manner that the deformable disc will allow further withdrawal only by being continuously deformed. For this purpose the periphery of the deformable disc may be provided with teeth which are engageable by the cooperating part of the coupling of the takeup reel when the vehicle deceleration and hence the acceleration of the shaft exceed a given limit, so that further withdrawal of the belt and rotation of the shaft can thereafter take place only by deformation of the disc.

If it is desired that a greater length of the belt would up on the shaft should be withdrawable with the simultaneous deformation of the disc, it must be borne in mind that in the course of continued withdrawal of the belt the lever arm at the end of which the pulling force acts on the shaft becomes continuously shorter. If it is therefore desired that the torque applied to the shaft should remain constant in the course of continuous withdrawal, it is advisable so to contrive the arrangement that the force or torque required for deforming the disc becomes progressively smaller as more of the belt is withdrawn.

Figure 3:
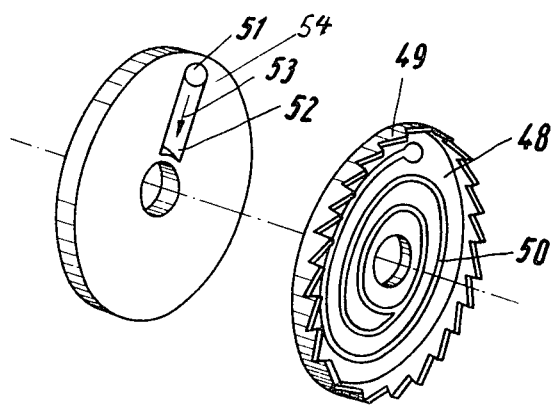
FIG. 3 is a similar view of a deformable reaction member in the form of a disc which simultaneously functions as a clutch element, and which is provided with peripheral teeth as well as with a spiral guideway for a movable deforming member.

In one embodiment (FIG. 3) of the invention this can be achieved by providing a deformable disc 48 with a spiral groove 50 which is engaged by a ball 51 movable in the radial groove 52 in a deforming member 54 bearing against the disc 48. The arrangement may be such that the ball 51 initially engages the outer convolution of the spiral groove 50 near the periphery of the disc 48. When the disc 48 is entrained by engagement of a coupling member with the teeth 49 of the disc 48 this will be rotated. The ball 51 must then follow the spiral groove 50 by moving in the radial groove 52 towards the shaft axis. It will be understood that the torque applied to the shaft must be greater when the ball 51 is near the periphery, as shown in FIG. 2, than when it has moved radially inwards in the direction indicated by the arrow 53. This decrease in torque may be arranged to be exactly equal to the decrease in torque due to the belt unwinding from the shaft. The resistance offered to the pull of the belt will thus remain constant.

Figure 4:
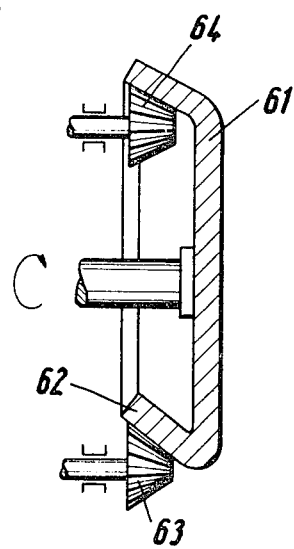
FIG. 4 is a cross section of a cup-shaped deformable disc.

FIG. 4 shows a cup-shaped deformable disc 61 having a substantially cylindrical rim 62 deformable by a first roller-type deforming member 63 which bends the rim inwards, whereas a second deforming member 64 bends it outwards again. The disc can thus be rotated any number of times and continuously subjected to deformation.

The invention may be embodied in other specific forms without departing from the spirit or essential characteristics thereof. The present embodiments are therefore to be considered in all respects as illustrative and not restrictive.

What is claimed is:

1. A tension limiter for safety belts in motor vehicles comprising
   a. a substantially disc-shaped plastically deformable reaction member,
   b. means for deforming said reaction member continuously in one direction at at least one spot and in the opposite direction at at least another spot, and
   c. a rotatable shaft about which one end of the safety belt is wound for rotating either said reaction member or deforming means,
   d. whereby the energy of forward motion of the belt wearer is absorbed by deformation of said reaction member as the end of said belt is unwound from said shaft.

2. A tension limiter according to claim 1, wherein the deforming means comprise two deforming members each provided with at least one projection, the projections pressing against the reaction member from opposite sides.

3. A tension limiter according to claim 1, wherein said reaction member is provided with a bend and said deforming means comprises two deforming members located on opposite sides of said reaction member and provided with a diametrical bend.

4. A tension limiter according to claim 3, comprising means for adjustably varying the distance between the two deforming members.

5. A tension limiter according to claim 2, wherein the reaction member is secured in a stationary position and the deforming members on both sides of the reaction member are operatively associated with the rotatable shaft.

6. A tension limiter according to claim 5, wherein each deforming member is provided with at least one projection of which one presses a corrugation into the rejection member from one side, whereas the other projection presses a corrugation into the reaction member from the other side during each revolution of the shaft.

7. A tension limiter according to claim 6, wherein the deforming members each contain a circular groove for the reception of the corrugation in the reaction member.

8. A tension limiter according to claim 6, wherein the projections on the deforming members are located the same radial distance away from the axis of the rotatable shaft.

9. A tension limiter according to claim 6, wherein at least one of the projection is a ball held in a recess in a deforming member.

10. A tension limiter according to claim 6, wherein the projections are adjustable screws.

11. A tension limiter according to claim 1, wherein the plastically deformable reaction member is cup-shaped and includes a rim, said deforming means comprising a first deforming member for bending said rim radially inwardly and a second deforming member for bending said rim radially outwardly.

12. A tension limiter according to claim 1, further comprising a frame member, said deforming means forming a part of said frame member.

* * * * *

PO-1050
(5/69)

UNITED STATES PATENT OFFICE
CERTIFICATE OF CORRECTION

Patent No. 3,632,060          Dated January 4, 1972

Inventor(s) ARNOLD BALDER

It is certified that error appears in the above-identified patent and that said Letters Patent are hereby corrected as shown below:

IN THE SPECIFICATION

Column 2, line 15, "member" should be -- members --.

Column 4, line 41, "would" should be -- wound --.

IN THE CLAIMS

Column 6, claim 6, line 6, "rejection" should be -- reaction --.

Signed and sealed this 6th day of June 1972.

(SEAL)
Attest:

EDWARD M. FLETCHER, JR.
Attesting Officer

ROBERT GOTTSCHALK
Commissioner of Patents